United States Patent [19]
Witenhafer

[11] Patent Number: 5,975,335
[45] Date of Patent: Nov. 2, 1999

[54] CHEMICAL REACTION VESSEL

[76] Inventor: Donald E. Witenhafer, 6045 Glenbarr Pl., Dublin, Ohio 43017

[21] Appl. No.: 09/097,509

[22] Filed: Jun. 15, 1998

[51] Int. Cl.[6] ..................................................... B23P 15/26
[52] U.S. Cl. ............................... 220/592.05; 220/592.28; 220/918; 422/241
[58] Field of Search ......................... 220/592.01, 592.05, 220/694.1, 918–920, 581; 422/241, 242, 112, 426

[56] References Cited

U.S. PATENT DOCUMENTS

| | | | |
|---|---|---|---|
| 2,663,654 | 7/1953 | Bergman | 422/241 |
| 2,772,860 | 12/1956 | Nelson | 422/241 |
| 2,973,252 | 2/1961 | Shields et al. | 422/241 |
| 3,008,811 | 11/1961 | Brumbaugh et al. | 422/241 |
| 3,030,193 | 4/1962 | Marullo et al. | 422/241 |
| 3,046,212 | 7/1962 | Anderson | 422/241 |
| 3,089,520 | 5/1963 | Huet | 220/592.28 |
| 3,476,283 | 11/1969 | Heinze et al. | 422/241 |
| 3,834,174 | 9/1974 | Strumbos | 220/592.28 |
| 4,054,981 | 10/1977 | Bridgegum | 220/592.28 |
| 4,541,990 | 9/1985 | Mitterbacher | 422/242 |
| 5,027,971 | 7/1991 | Perryman | 220/426 |
| 5,167,930 | 12/1992 | Fassbender | 422/112 |

*Primary Examiner*—Joseph M. Moy

[57] ABSTRACT

A pressure proof reaction vessel and the method of making and operating such a vessel wherein the vessel has a thin inner wall whose primary function is to conduct heat and a thick outer wall whose primary function is to contain the pressure with said inner wall being supported by the said outer wall using closely-spaced supports between the two walls. Heat transfer fluid flows in channels formed by the two walls. A novel method of fastening together the inner and outer walls of such a vessel using fastening means associated with a hole passing through the outer wall and that do not introduce surface disruption of the inside surface of the inner wall, is disclosed. This fastening means also allows for a very economical fabrication method whereby the inner wall and the supports are formed out of one piece of material. The vessel is particularly useful for the polymerization of vinyl chloride in large reaction vessels greater than 10,000 gallons in size.

7 Claims, 5 Drawing Sheets

CHEMICAL REACTION VESSEL

BACKGROUND OF THE INVENTION

This invention relates to an improved large chemical reaction vessel useful for conducting exothermic reactions under conditions of highly elevated pressure and wherein agitation conditions within the reactor strongly affect the quality or quantity of the finished product and also where the smooth condition of the inside surface of the reaction vessel is important for preventing buildup and fouling of that surface. The suspension polymerization of vinyl chloride is a particularly good example of such a reaction and will be used to exemplify the use of the improved reactor and operating conditions.

Vinyl chloride monomer is polymerized in a water suspension under high pressure and the polymerization reaction releases a considerable amount of heat. Unless this heat of polymerization is removed from the reacting mixture, the heat will raise the temperature of the continuing polymerization. Raising the temperature of the polymerization in turn increases the rate of the polymerization reaction resulting in an even greater rate of heat release and a possible run-away reaction and the subsequent discharge of the reactor contents via emergency relief methods. Thus, temperature control is an absolute requirement for suspension vinyl chloride polymerizations. It is also necessary to subject the suspension polymerization to a relatively high level of agitation. The high agitation level is designed to accomplish many things. The high agitation promotes the transfer of the heat of reaction to the wall where it can be removed by conduction through the wall. The high agitation also keeps the contents of the reactor well mixed and prevents the segregation of the vinyl chloride monomer into regions of low agitation which results in "hot spots" and the possibility of reactor over pressurization. The high agitation also plays a critical role in the particle size, particle size distribution, and other key properties of the finished polyvinyl chloride product. Because the polymerization is run at elevated pressure, the pressure-retaining wall of the reaction vessel must be relatively thick. The increased thickness becomes an added barrier to efficient heat transfer through this thick wall. As the industry has reduced capital costs by building larger polymerization vessels, in the size range from 10,000 gallons to 60,000 gallons or more, the walls of the vessels have perforce been made thicker to safely contain the internal pressures of up to 225 pounds per square inch or more created by the vapor pressure of the vinyl chloride. These thick walls result in reduced ability to remove the heat of polymerization by the standard method of heat conduction through the walls. In addition to this thick-wall effect, the amount of wall surface area per unit volume of the reactors is reduced as the size of the reactor is increased, thus compounding the problem.

There have been several methods described in the prior art for accomplishing the necessary increased heat removal. One method is to use reflux condensers atop the reactors to condense vaporized vinyl chloride, cool it, and return the cooled liquid to the reactor. Reflux condensers are efficient at removing the heat of polymerization but their use introduces some new requirements. They require that the liquid level in the reactor be kept low to allow for the control of foaming and they often require the use of chemical antifoam additives that are costly and sometimes adversely affect the quality of the product. Also, the use of too much reflux cooling can have a deleterious effect on the quality of some grades of product poly vinyl chloride resin, thus, limiting the utility of this method.

A second method for heat removal that has been described is to place cooling structures such a baffles, coils, and the like inside the polymerization vessel. The amount of heat that can be removed by this means is also limited because baffles or coils will alter the highly critical agitation within the reaction vessel and interfere with the quality of the product if excessively or incorrectly used.

A third heat removal method is the use of a reaction vessel having a thin inner wall with a jacket between the inner wall and thick outer wall as taught by Perryman in U.S. Pat. No. 5,027,971. In the teachings of this patent, the reactor is formed by welding flow channel walls to the inside of a thick pressure supporting outer wall and then subsequently plug welding the thin inner wall to the flow channel walls to produce a reactor with a cooling jacket between the walls. The reactor as described in U.S. Pat. No. 5,027,971 has several disadvantages. The plug weld points are internal defects on the surface in contact with the polymerization mixture and, as such, can be locations where polymer buildup and fouling can occur. Substantial fouling requires that the reactor be shut down, opened, and cleaned to remove the fouling deposits. The fabrication cost of the Perryman reactor is believed to be high because of the complex welding required.

SUMMARY OF THE INVENTION

This invention is a double-walled chemical reaction vessel for use at elevated pressure. The vessel has a very thin inner wall and a relatively thick outer wall. The outer wall is thick enough to withstand the pressure contained in the vessel. The thin inner wall is too thin by itself to resist the pressure in the vessel without being supported by closely-spaced supports that extend inwardly from the thick outer wall to the thin inner wall, but with this support, the inner wall contains the high-pressure reaction fluid within it. Because the supports are closely spaced, the inner wall can be very thin since its tendency to expand outwardly from internal pressure and subsequently rupture is prevented by the closely-spaced supports, which are in turn held in place by contact with the thick outer wall. The space between the walls is totally inaccessible to the reaction fluid contained within the inner wall. Heat transfer fluid is made to flow in the space between the two walls and between the closely-spaced supports to remove heat that passes through the thin inner wall from the reacting fluid. Because the inner wall is substantially thinner than would be possible without this unique design, and further since the heat transfer takes place through this thin wall, substantially higher heat transfer rates can be achieved with this new reactor design than would be possible were this heat be required to pass through a thick pressure-containing wall with a cooling jacket on the outside as is often done with smaller high-pressure reaction vessels.

The current invention is a substantial improvement over the teachings of U.S. Pat. No. 5,027,971 for two reasons. The first involves a unique method of fastening the vessel parts together by a means such as bolts, rivets, pins, or welds that pass through or are made possible by holes through the thickness of the outer wall. By attaching the inner wall by this means, surface defects such as welds on the inside surface of the inner wall can be greatly reduced and locations for buildup and fouling eliminated. The second improvement that is used in preferred embodiments of the current invention, is to form the thin inner wall and the supports out of one piece of material which, when employed in conjunction with the unique fastening means, simplifies the vessel construction process, resulting in reduced vessel fabrication cost.

DETAILED DESCRIPTION

Figure 1:
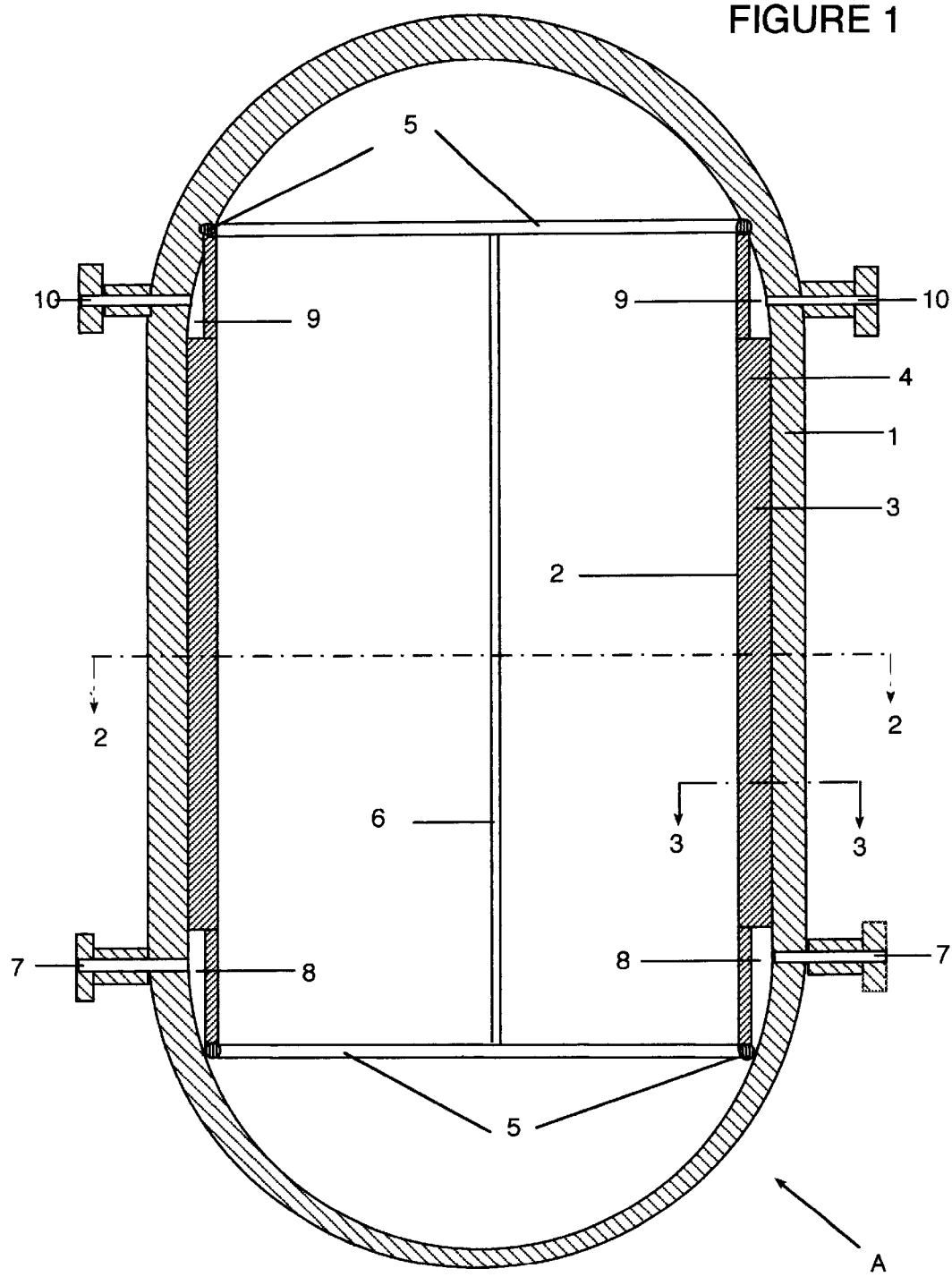
FIG. 1 is a longitudinal cross-sectional view of a cylindrical reaction vessel showing the thin inner wall and the thick outer wall.

As stated previously, this improved reaction vessel is particularly suited for the suspension polymerization of vinyl chloride, although other uses would be obvious. Vinyl chloride polymerizations have a high heat release rate and the quality of the product is known to be very sensitive to the agitation inside the reaction vessel. Vinyl chloride polymerizations are known to form a thin skin of polymer on the inside surface of the reactor often called buildup or fouling. This buildup is related to the agitation and is also known to especially form on trouble spots such as rough surfaces or at welds. Thus, this invention is particularly useful for the suspension polymerization of vinyl chloride, although the high heat-removal capability of the new reaction vessel would be useful for many other uses known to those skilled in the art. For vinyl chloride polymerizations, the instant invention is particularly useful for polymerization reactors greater than about 10,000 gallons in size. It is even more useful for reactors greater than 20,000 gallons and is still more useful for reactors greater than 30,000 gallons where the achievement of reasonable reaction rates requires the use of enhanced heat removal methods. Since it is quite normal for vinyl chloride suspension polymerizations to be conducted in cylindrical reaction vessels mounted with the cylindrical axis vertical, the invention will be described and illustrated for this geometry. It should be understood, however, that this is for illustration purposes only and many other shapes and orientations are useful.

The key to achieving high heat removal is to have a very thin inner wall, the primary function of which is to contain the reaction fluid and to transfer heat, and a thick outer wall the primary function of which is to contain the pressure in the reactor. In the vessel of the instant invention, heat transfer fluid flows between the two walls in what may be described as an inner jacket. The heat transfer fluid inside the inner jacket is completely isolated from the inside of the vessel to prevent contamination of the reactor contents by the heat transfer fluid. The thin inner wall, being too thin to resist the internal pressure without support, is bridged to and supported by the thick outer wall using closely-spaced supports.

The thickness of the thin inner wall will depend on factors that include the strength of the material of construction, the pressure inside the vessel, and the distance between support points. The thickness of the inner wall can be decreased drastically as the support points are made closer together; the spacing between the supports is a key and critical concern in the design and construction of the instant reaction vessel.

Since reaction vessels can be made over a wide range of sizes and shapes, it is very useful to define a "Relative Distance" that can be associated with any given vessel and used to describe dimensions for that vessel. We may define a "Relative Distance" as the cube root of the internal volume of the vessel when the volume is expressed in units of cubic distance. Thus, a reaction vessel having an internal volume of 27 cubic meters would have a "Relative Distance" of three meters. Sizes and distances can then be expressed as factors of their "Relative Distance".

The spacing between supports of the instant reaction vessel is absolutely critical and must be less than approximately one eighth ($\frac{1}{8}$) the "Relative Distance" in order to get the inner wall thin enough to have reasonably substantial benefit. Spacings greater than this can be used to some advantage, but the major benefit results from having spacing less than specified above. For many reactors, a support spacing of one twentieth ($\frac{1}{20}$) or less of the "Relative Distance" is preferred. If possible a support spacing of ($\frac{1}{50}$) or less of the "Relative Distance" is more preferred. The support spacing should in general be minimized within the limitations of the cost of fabricating the vessel, thus enabling the inner wall to be as thin as practical.

As stated previously, the inner wall thickness will be highly dependent upon the distance between the supports, the material of construction, and the internal pressure in the reactor. Although it is an object of the present invention to permit the inner wall to be as thin as practical, it should be remembered that there is a limit to the thinness of the inner wall. The inner wall must not be so thin that it can not withstand the normal wear and tear of reactor operation nor can it be so thin that it does not withstand fabrication means. It should in general be possible for large (20,000 gallon or more) steel reactors operating at pressures up to the 225 pounds-per-square-inch-range to get inner wall thicknesses of less than ½ inch, with thicknesses of less than ¼ inch being preferred and thicknesses of less than ⅛ inch or less being even more preferred. Inner wall thicknesses of less than about $\frac{1}{16}$ inch may be too thin to withstand fabrication or wear and tear associated with agitation or vessel opening and entry. This lower limit in inner wall thickness would depend on the details of the vessel design, operation, and fabrication means and is only a general guideline. Since externally-jacketed reactors in this size range for PVC polymerization are known to have wall thicknesses well in excess of one inch, this invention can produce a substantial reduction in the thickness of the wall through which heat is transferred resulting in substantially improved heat transfer and increased reactor productivity.

The space between the walls is filled with the heat transfer fluid which flows through this internal jacket and carries away the heat of reaction. The distance between the walls will therefore depend on many considerations, among them are: the amount of heat required to be removed, the surface area through which the heat is to be transferred, the temperature of the reaction, the temperature of the heat transfer fluid, the heat capacity of the heat transfer fluid, etc. In general, however, the spacing between the walls should be as small as possible consistent with having the ability to put sufficient volume of heat transfer fluid through the internal jacket at reasonable pressure drop to remove the necessary amount of heat. Having the spacing as small as possible promotes turbulent flow in the internal jacket and therefore promotes increased heat transfer. Thus, there is an optimum spacing between the two walls for each application and those skilled in the art can easily determine the spacing based on known art.

The thickness of the outer wall is not critical to the instant invention as long as it is thick enough to fully contain the internal pressure and is only limited by the cost of the material used in the construction. Generally the thicker the outer wall the better. Thus for large steel vinyl chloride polymerizers in the 20,000 gallon size range, outer wall thicknesses of 2 inches or more can be used.

The shape and nature of the supports between the walls, other than their relative spacing, are not highly critical to the instant invention. However, they must obviously be thick enough and strong enough to carry the force transferred from the thin inner wall to the thick outer wall without buckling or failing in any way.

Another very important feature of the instant invention is that it enables a large reactor to be constructed with a minimum amount of disruptions, or blemishes such as protruding fasteners or weld spots on the inside surface of the inner wall. As was stated earlier, such defects are sites for buildup and fouling and require the vessel to be opened and cleaned more frequently resulting in lost productivity and worker exposure to chemicals. The good, smooth, unmodified inside surface of the inner wall results from a unique method of fastening together a vessel of this type using fastening means that pass through a hole in the outer wall. Fastening means suitable for this purpose are well known in the art. As examples, there may be named, bolts, rivets, thermal expansion pins, and the like. Another type of through-the-wall fastening means would also be a simple hole in the outer wall which allows welding to take place at the inside surface of the outer wall. All of these fastening means are seen to be associated with a hole through the outer wall of the vessel. These through-the-wall fastening means are used to attach the supports to the inside surface of the outer wall after the internal structure comprising the inner wall and the supports has been fabricated and inserted within the outer vessel. Examples of these fastening means will be further illustrated later.

The size, number and location of the through the wall fastening means will depend on the details of the operation of the reaction vessel. The through-the-wall fasteners serve several functions. First, they must carry the weight of the inner wall and supports. Second, they must resist the forces on the wall caused by the agitation in the reactor. Third, they must prevent the inner wall from imploding into the central chamber if the pressure in the jacket becomes higher than the pressure inside the reactor. This last consideration is likely to be the most important, especially for large reactors. Fortunately, we are describing a pressure vessel where the pressure inside the vessel is actually helping to keep the need for a large number of fasteners such as bolts to a minimum because the inner pressure pushes the supports onto the outside wall and thereby helps hold the vessel together. These considerations should allow someone with ordinary skill in the art to design a vessel with sufficient fasteners once the operating conditions are defined.

Still another important feature of preferred embodiments, of this invention is to simplify the construction of the vessel and lower its cost by forming the inner wall and the supports out of one piece of material. This method of vessel construction greatly simplifies the construction process because extensive welding is not required and results in reduced cost of the vessel.

All of the above-described features will be illustrated more fully in the following detailed description of a preferred embodiment of the invention.

DETAILED DESCRIPTION OF A PREFERRED EMBODIMENT

Figure 2:
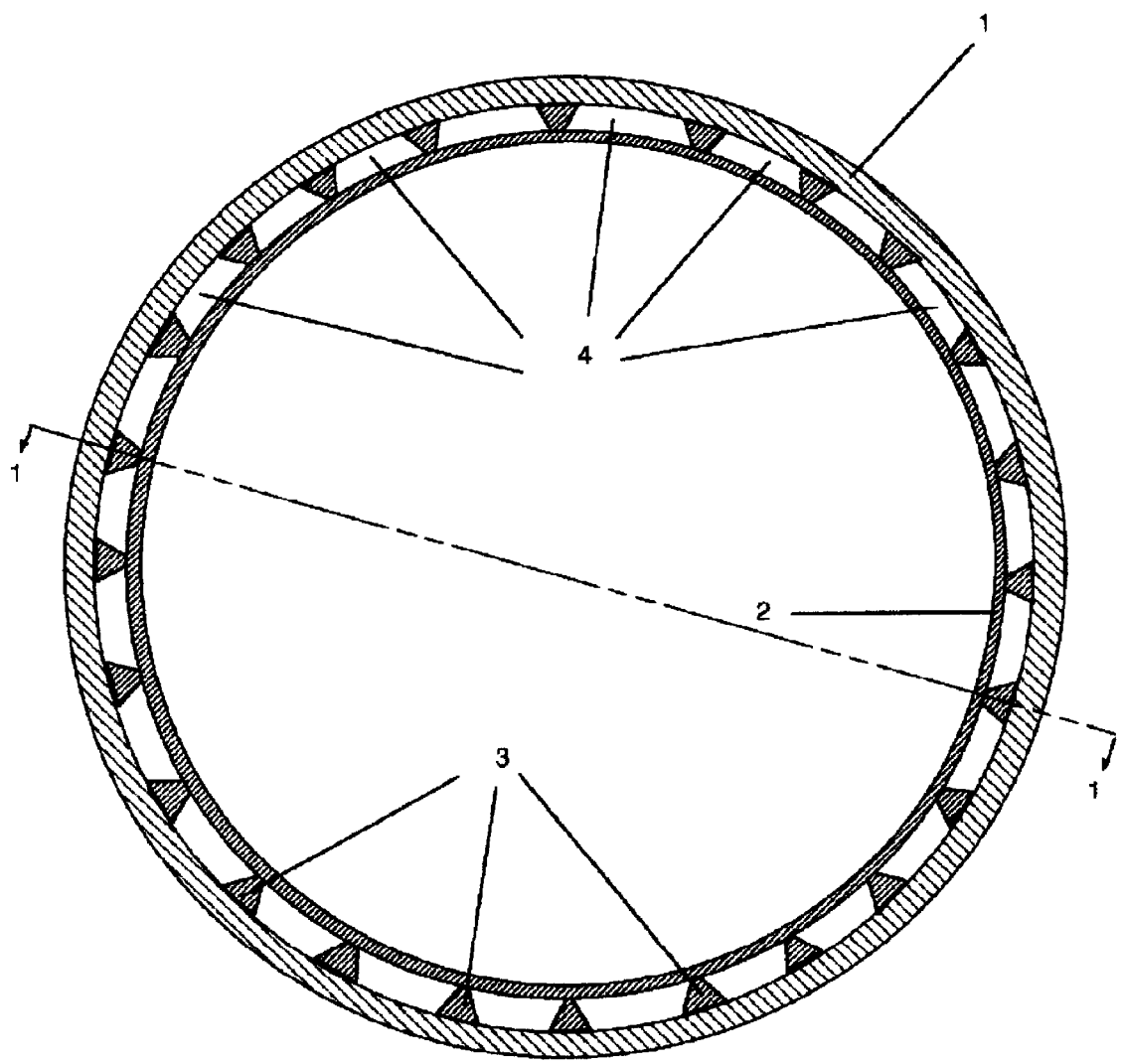
FIG. 2 is a circumferential cross-sectional view of the vessel of FIG. 1 along the 2—2 line of FIG. 1.

A more detailed description of one preferred embodiment of the reactor of the present invention is shown in FIG. 1 and FIG. 2. This preferred embodiment is for illustration purposes only and should not be considered limiting in any way. FIGS. 1 and 2 show cross-sectional views of a vertical cylindrical reactor having a double wall on the straight cylindrical wall portion of the reactor. The ends of the vessel are formed of domes welded to the cylindrical walls. In this embodiment, flow channels for guiding the flow of heat transfer fluid between the two walls run vertically. By that I mean that they run from the bottom to the top of the reactor. Other arrangements of the flow channels could be equally beneficial. In fact, is is not absolutely required to have flow channels as shown in this illustration at all. All that is required is to have closely-spaced supports which could be point supports rather than channel supports as described in this example. The auxiliary equipment for the reactor A in FIG. 1 and FIG. 2 such as the agitator, charging nozzles, manway, and drain port are not shown for simplicity, but they would be located through the top or bottom domed sections of the reactor at locations where the double wall is not present. The thick outer wall 1 serves as the pressure support for the total structure. The thin inner wall 2 is the wall through which the heat of reaction is transferred. The thin inner wall 2 is supported and connected to the outer wall 1 by closely-spaced vertical supports 3. The short circumferential spacing between these vertical support structures is the previously described critical close spacing that prevents the thin inner wall from deforming outwardly when the reactor is under pressure. Coolant fluid in the flow channels 4, located between these support structures, is isolated from the contents of the reactor by sealing the inner wall 2 to the outer wall 1 at the top and bottom, as well as sealing the vertical end of the thin inner wall to itself. In this example circular welds 5 are used at the top and bottom. A vertical weld 6 fastens the butt end of the thin inner wall to itself to complete the seal. Cooling water enters through nozzle 7, is distributed horizontally through horizontal distribution header 8 and then flows vertically upward through the flow channels 4 that are defined by the vertical wall supports 3. After reaching the top of the reactor, the coolant enters another horizontal distribution header 9 and then exits from the reactor at exit nozzle 10. Multiple entrance and exit nozzles are highly desirable and they should be spaced around the circumference of the reactor in a manner to keep coolant pressure drop low and jacket flow rates high, resulting in the highly desirable turbulent flow in the flow channels 4. The number and location of the inlet and exit nozzles about the circumference of the reactor will depend on the reactor size, shape, and details of the flow channels. The materials of construction can be any of those known to those skilled in the art. For vinyl chloride polymerization, stainless steel or stainless steel clad steel is highly desirable because of the acid released during the polymerization. All surfaces exposed to the reaction mixture therefore are preferably stainless steel.

Figure 3:
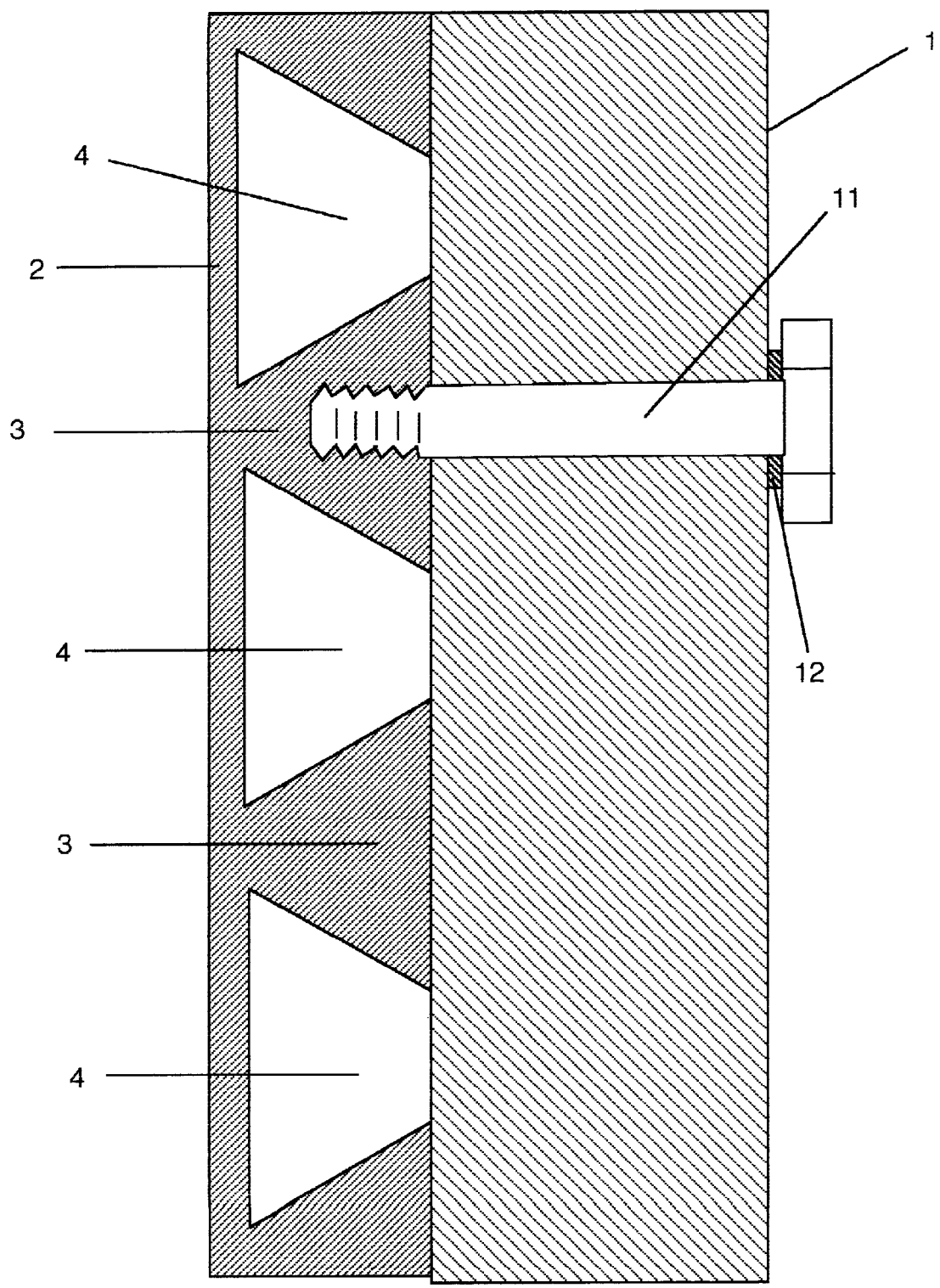
FIG. 3 is a detailed cross-sectional view of a wall section of the vessel in FIG. 1 along the 3—3 line of FIG. 1 and shows a bolt fastener.

More details of the double wall design and fastening means are illustrated in FIG. 3, which is a detailed cross-sectional view of the double walls showing a bolt fastener 11 passing through the outer wall 1. This preferred embodiment of the invention has the inner wall and the trapezoidal-shaped supports 3 cut out of one large thick sheet of metal. In this case, the flow channels 4 are located where the metal was cut out of the thick sheet. The trapezoidal shape of the support has the advantage in that it creates the maximum amount of coolant-wetted surface on the outside surface of the inner wall and at the same time offers a wide base for fastening the internal structure to the outer wall 1. In this example, the internal structure 2 and 3 is fastened to the outer wall with bolts 11. Multiple bolts may be required but only one is shown in this drawing. A seal 12 prevents the coolant from leaking out of the jacket. In this case, a lead or other soft metal washer could be used to seal the bolt hole, although many other sealing methods, such as o-rings, soldering, rubber sealant, and the like, will be obvious to those skilled in the art. As stated previously, the distance between the outside surface of the thin inner wall 2 and the inside surface of the thick outer wall 1 or flow channel thickness should be optimized to give highly-turbulent coolant flow in the said flow channels between the walls. Note that the inside surface of the inner wall has not been disturbed in any way by the bolt fastening. Thus, no rough spot or fouling promoter has been created.

Figure 4:
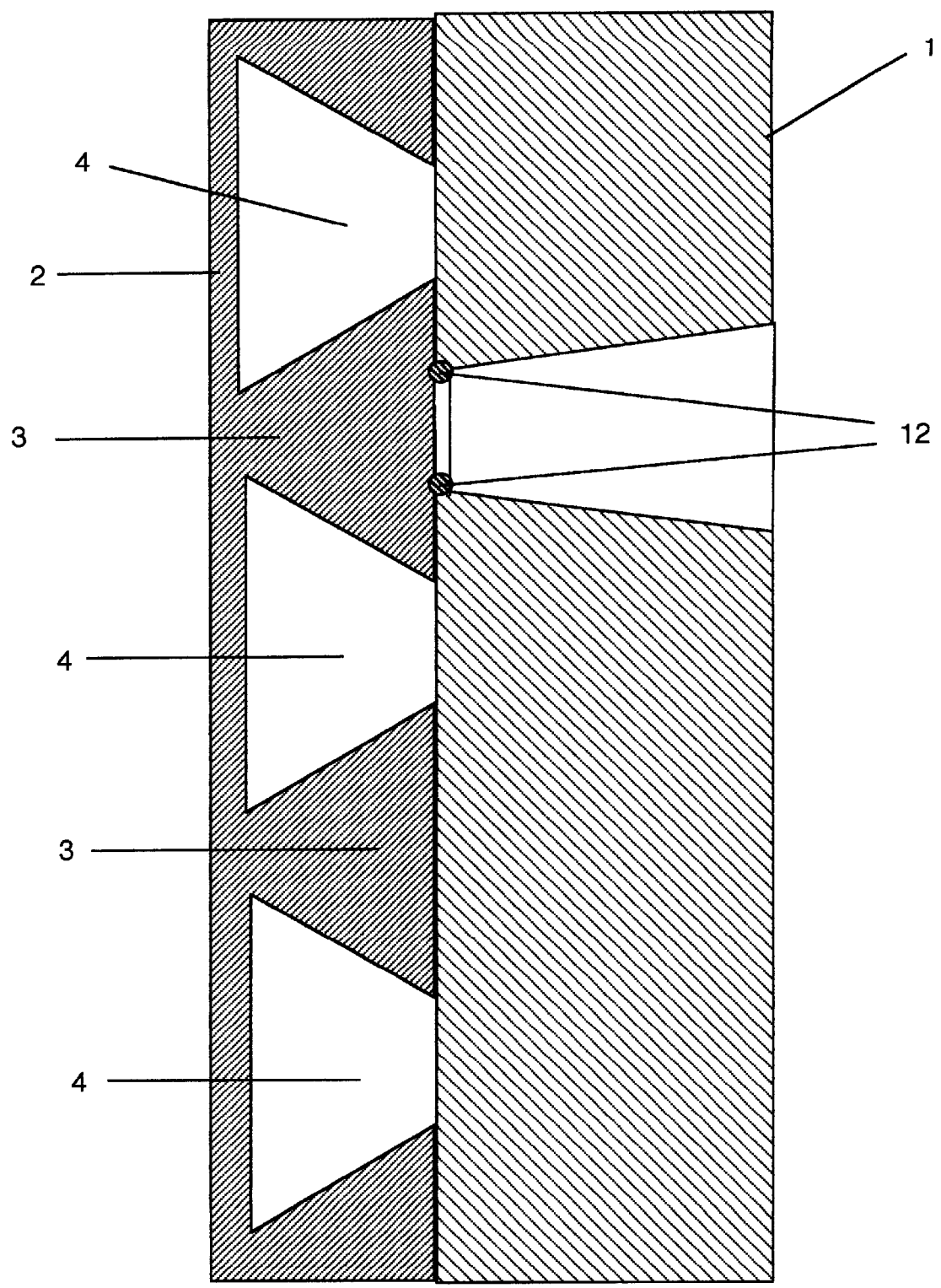
FIG. 4 shows an alternate through-the-wall fastening means using a weld.

FIG. 4 shows how welding can be used in place of a bolt. in an equally preferred embodiment. In this case a hole that runs through the outer wall 1 permits the welding 12 of the supports to inner surface of the outer wall 1. Again, note that no rough spot or fouling promoter has been created.

Figure 5:
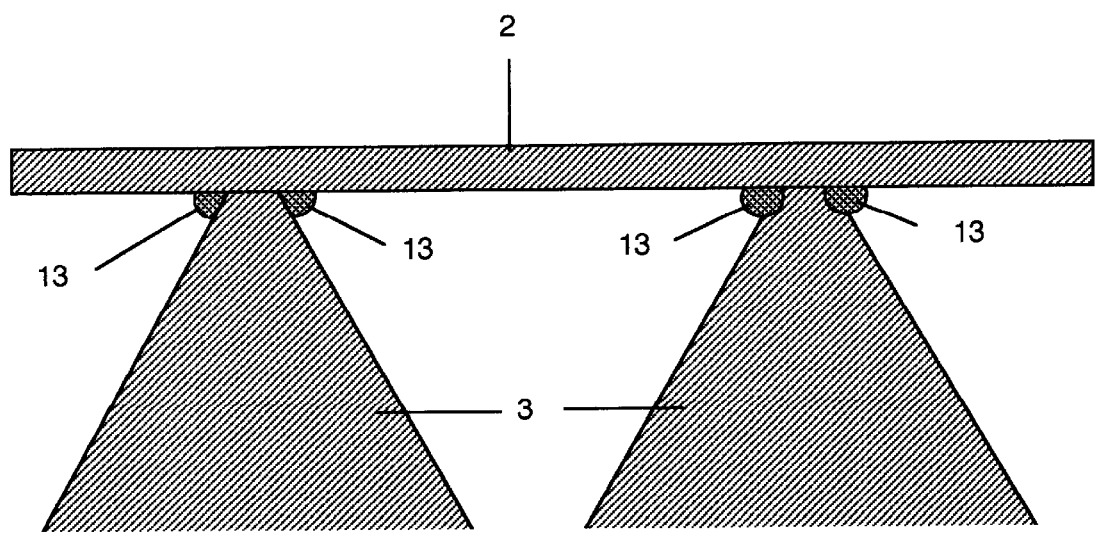
FIG. 5 shows an alternate means of attaching supports to the inner wall using welds.

FIG. 5 shows a less-desirable embodiment where the internal structure consisting of the inner wall 2 and the supports 3 is formed by attaching the supports 3 to the outside surface of the inner wall 2 with welds 13. This embodiment should be considered when the required spacing between the walls becomes large and fabrication would therefore necessitate the cutting away of very large amounts of metal.

One method of fabrication of the reactor shown in FIG. 1 follows. First the bottom dome and the cylindrical outer wall of the reactor are fastened together by welding with the top dome portion not yet attached. The internal structure 2 and 3 can be fabricated by cutting the multiple flow channels from a single flat sheet of a material such as stainless steel. The thickness of this starting sheet should be the combined thickness of the inner wall plus the desired spacing between the walls. Flow channels and the distribution headers can be cut into the metal after it has been bent to just fit inside the inside surface of the outer wall of the reactor or prior to the bending—whichever is most convenient. The bent internal structure thus formed can then be inserted into the reactor from the open end and fastened to the outer wall using the through-the-wall fastening means. The mating ends of the bent internal structure are then welded together to create a continuous seal 6. The top dome portion of the outer wall is then welded into place to complete the pressure-containing outer vessel, followed by welding at 5 the top and bottom of the inner wall to the top and bottom domes respectively to create continuous circumferential seals to completely isolate the internal jacket from the contents of the reactor and to complete the fabrication. It may be necessary, particularly in very large reactors, to form the internal structure out of more than one piece of sheet metal, thereby having multiple vertical and circumferential welds that join the ends of the individual sheets of metal together. It is, however, advantageous to reduce the number of internal welds because they serve as surface defects that promote buildup and fouling.

It should be obvious that the vessel and procedures of the present invention can be used in conjunction with the other methods known to those skilled in the art. Thus there is no reason why the vessel can not be equipped with a reflux condenser or cooled baffles or coils in addition to the thin internal wall and such vessels are understood to be within the scope of the present invention.

Various modifications of the present invention will be obvious to those skilled in the art. It is therefore understood that within the scope of the appended claims the invention can be practiced otherwise than as specifically described.

What is claimed is:

1. A pressure vessel having a central chamber containing said pressure; said vessel comprising a pressure retaining first wall having an outer surface and an inner surface; said vessel also comprising a second wall within and substantially concentric with said first wall and having an inner surface and an outer surface; said outer surface of said second wall having closely-spaced supports attached thereto, which supports contact said inner surface of said first wall and provide support therefrom for said second wall which is too thin to resist said internal pressure of said central chamber without the support provided by said closely-spaced supports in contact with said first wall; said closely-spaced supports having a distance between them that is less than approximately ⅛ of the cube root of the volume of said central chamber; said supports being attached to said inner surface of said first wall using a fastening means associated with a hole through said first wall; the space between said outside surface of said second wall and said inside surface of said first wall forming an internal jacket for the flow and distribution of heat transfer fluid for heating and cooling the contents of said central chamber; said internal jacket being completely isolated from said central chamber; said first wall having at least two openings therethrough for input and output of said heat transfer fluid.

2. The vessel of claim 1 wherein said vessel is substantially cylindrical in shape having a longitudinal axis and a circular cross section.

3. The vessel of claim 1 wherein said second wall is attached to said supports by being formed from one piece of material.

4. The vessel of claim 2 wherein said supports consist of substantially parallel strips of material oriented parallel to said longitudinal axis of said vessel thereby forming longitudinal flow channels for directing the flow of said cooling fluid; said internal jacket also containing at least two distribution headers for distributing the cooling fluid into and out of said longitudinal flow channels.

5. The vessel of claim 2 designed for a vinyl chloride suspension polymerization and having a designed working pressure of up to 225 pounds per square inch gauge; said central chamber having a volume greater than 10,000 gallons; said closely-spaced supports having a distance between them of less than twelve inches; and said second wall having a thickness of less than ¼ inch.

6. The vessel of claims 1, 2, 3, 4, or 5 in which said fastening means associated with a hole through said first wall comprises a threaded fastener.

7. The vessel of claims 1, 2, 3, 4, or 5 in which said fastening means associated with a hole through said first wall comprises a weld attaching the inside surface of said first wall to said supports; said weld being made possible by said hole through said first wall.

* * * * *